(12) United States Patent
Oi (10) Patent No.: US 11,552,853 B2
(45) Date of Patent: Jan. 10, 2023

(54) SERVICE CHAIN ACCOMODATION APPARATUS AND SERVICE CHAIN ACCOMMODATION METHOD

(71) Applicant: Nippon Telegraph and Telephone Corporation, Tokyo (JP)

(72) Inventor: Aiko Oi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 53 days.

(21) Appl. No.: 17/262,600

(22) PCT Filed: Jul. 17, 2019

(86) PCT No.: PCT/JP2019/028118
§ 371 (c)(1),
(2) Date: Jan. 22, 2021

(87) PCT Pub. No.: WO2012/026814
PCT Pub. Date: Feb. 6, 2020

(65) Prior Publication Data
US 2021/0266227 A1   Aug. 26, 2021

(30) Foreign Application Priority Data

Jul. 31, 2018  (JP) .............................. JP2018-143105

(51) Int. Cl.
*H04L 41/0896* (2022.01)
*H04L 41/5041* (2022.01)
(Continued)

(52) U.S. Cl.
CPC ...... *H04L 41/0896* (2013.01); *H04L 41/5045* (2013.01); *H04L 41/5054* (2013.01);
(Continued)

(58) Field of Classification Search
CPC . H04L 41/0896; H04L 45/28; H04L 43/0817; H04L 45/306; H04L 41/5054; H04L 41/5045
See application file for complete search history.

(56) References Cited

U.S. PATENT DOCUMENTS

2016/0353465 A1* 12/2016 Vrzic ................ H04W 28/0221
2016/0366014 A1* 12/2016 Koo .................... G06F 9/45558
(Continued)

FOREIGN PATENT DOCUMENTS

JP          2012-142906         7/2012

OTHER PUBLICATIONS

Yamamoto et al., "Chapter 3 Quality Control Technology," IEICE, 2011, pp. 1-29, 60 pages (with English Translation).

*Primary Examiner* — Thu V Nguyen
*Assistant Examiner* — Mohammed Ahmed
(74) *Attorney, Agent, or Firm* — Fish & Richardson P.C.

(57) ABSTRACT

A service chain accommodation device includes an influence coefficient calculation unit that calculates an influence coefficient indicating that an influence at the time of processing failure of a service chain is greater for a VNF located in a subsequent stage of a service chain and a VNF shared among a plurality of service chains, a residual resource calculation unit that corrects an amount of residual resources that can be accommodated for each of the VNFs through which the service chain passes, and an accommodation design unit that assigns a new service chain on the basis of the amount of the residual resources.

6 Claims, 8 Drawing Sheets

(51) Int. Cl.
*H04L 41/5054* (2022.01)
*H04L 43/0817* (2022.01)
*H04L 45/28* (2022.01)
*H04L 45/302* (2022.01)

(52) U.S. Cl.
CPC .......... *H04L 43/0817* (2013.01); *H04L 45/28* (2013.01); *H04L 45/306* (2013.01)

(56) References Cited

U.S. PATENT DOCUMENTS

| | | | |
|---|---|---|---|
| 2019/0050248 A1* | 2/2019 | Oohira | G06F 9/46 |
| 2019/0303203 A1* | 10/2019 | Guan | G06F 9/5077 |
| 2020/0028749 A1* | 1/2020 | Dhandu | H04L 43/20 |
| 2021/0266227 A1* | 8/2021 | Oi | H04L 45/28 |

* cited by examiner

| VNF ID ~21 | AFFILIATION SERVICE CHAIN ID ~22 | SERVICE CHAIN-SPECIFIC REQUIRED BAND ~23 | VNF-SPECIFIC REQUIRED BAND ~24 | AVERAGE USAGE BAND IN EACH VNF SPECIFIC TO SERVICE CHAIN ~25 | SERVICE CHAIN-SPECIFIC CUMULATIVE AVERAGE USAGE BAND ~26 | VNF-SPECIFIC CUMULATIVE AVERAGE USAGE BAND ~27 | INFLUENCE COEFFICIENT AT TIME OF OVERFLOW: k ~28 |
|---|---|---|---|---|---|---|---|
| F1 | B | 500 | 500 | 300 | 600 ※F3:300, F1:300 | 600 | 1 (600/600) |
| F2 | A | 100 | 100 | 50 | 50 | 50 | 0.08 (50/600) |
| F3 | A | 100 | 600 | 50 | 100 ※F2:50, F3:50 | 400 | 0.67 (400/600) |
|    | B | 500 |     | 300 | 300 |     |     |

Fig. 3

| VNF ID ~21 | BAND THAT CAN BE ACCOMMODATED ~31 | RESIDUAL BAND ~32 | THEORETICAL RESIDUAL BAND ~33 | GAP VALUE OF RESIDUAL BAND ~34 | DESIGN VALUE OF RESIDUAL BAND ~35 |
|---|---|---|---|---|---|
| F1 | 1000 | 500 | 700 | +200 | 500<br>200*(1−1)+500 |
| F2 | 500 | 400 | 450 | +50 | 449<br>50*(1−0.08)+400 |
| F3 | 1000 | 400 | 650 | +250 | 482.5<br>250*(1−0.67)+400 |

| VNF ID ~21 | DESIGN VALUE OF RESIDUAL BAND ~35 |
|---|---|
| F1 | 500<br>200*(1-1)+500 |
| F2 | 449<br>50*(1-0.08)+400 |
| F3 | 482.5<br>250*(1-0.67)+400 |

30

| VNF ID ~21 | AFFILIATION SERVICE CHAIN ID ~22 | NEW SERVICE CHAIN-SPECIFIC REQUIRED BAND ~51 | NEW VNF-SPECIFIC REQUIRED BAND ~52 |
|---|---|---|---|
| F2 | C | 400 | 400 |
| F3 | C | 400 | 850 |
| | D | 450 | |
| F4 | C | 400 | 850 |
| | D | 450 | |

SERVICE CHAIN ACCOMODATION APPARATUS AND SERVICE CHAIN ACCOMMODATION METHOD

CROSS-REFERENCE TO RELATED APPLICATIONS

This application is a National Stage application under 35 U.S.C. § 371 of International Application No. PCT/JP2019/028118, having an International Filing Date of Jul. 17, 2019, which claims priority to Japanese Application Serial No. 2018-143105, filed on Jul. 31, 2018. The disclosure of the prior application is considered part of the disclosure of this application, and is incorporated in its entirety into this application.

TECHNICAL FIELD

The present invention relates to a service chain accommodation device and a service chain accommodation method.

BACKGROUND ART

A guarantee type that guarantees quality of services provided by a carrier and a best effort type that does not guarantee the quality of services have different advantages and disadvantages. In the guarantee type, because resources are occupied by a specific user, usage charges of individual users are high, but satisfaction with the quality of services is high. On the other hand, in the best effort type, because resources are shared by a plurality of users, usage charges of individual users are low, but the quality of services may be degraded at times of congestion.

Non Patent Literature 1 describes a controlled-load service as a standard for recognizing an operation of overbooking that exceeds a processing capacity of resources to realize a best effort type.

For shared resources that are used in the best effort type, it is desirable for access to be prevented from concentrating on some of the shared resources as much as possible through load balance across a network.

Therefore, Patent Literature 1 describes a line accommodation design device that realizes an accommodation design such that bias of a shared band to be used in a best effort type is reduced when an accommodation destination of a subscriber line to be used in a guarantee type is designed. The band is a communication speed per unit time with respect to an amount of data flow in a communication service, and when the band is broader, an amount of flowing data is larger.

CITATION LIST

Patent Literature

Patent Literature 1: JP 2012-142906 A

Non Patent Literature

Non Patent Literature 1: Miki Yamamoto, "Quality Control Technology," [online], Jun. 9, 2018, The Institute of Electronics, Information and Communication Engineers, Group 3 (Computer Networks)-5 (Communication Quality)—Chapter 3, [Retrieved on Jul. 23, 2018], Internet <URL: http://www.ieice-hbkb.org/files/03/03gun_05hen_03.pdf>

SUMMARY OF THE INVENTION

Technical Problem

In an existing network service, various network functions have been provided in physical devices (appliances). Therefore, such physical devices serving to provide sources of the network functions were fixed and flexibility was lacking. Thus, an attempt to apply a virtualization technique for constructing a virtual machine (VM) using a physical device to network resources is becoming widespread.

Network function virtualization (NFV) is a virtualization technology in which various network functions are provided in a virtual machine (software). Because a virtual machine gives flexibility to disposition of network functions, it is possible to flexibly meet individual demands of users.

A network function virtualized by an NFV technology is referred to as a virtualized network function (VNF). Examples of the VNF include virtualized customer premises equipment (vCPE), vRouter, vMitigator, virtualized firewall (vFW), virtualized load balancer (vLB), and virtualized deep packet inspection (vDPI).

A technology of enabling each user to flexibly select and use the VNF is referred to as service chaining. A series of services provided by service chaining is referred to as a service chain. Using the service chain, it is possible to realize network functions provided by a dedicated appliance with a software (virtual machine) group on a virtualized infrastructure. That is, using an NFV technology, network devices are separated into software and hardware, and a network function group realized on a virtualized infrastructure including general-purpose servers is connected in a string by service chaining and provided as one service.

Figure 7:
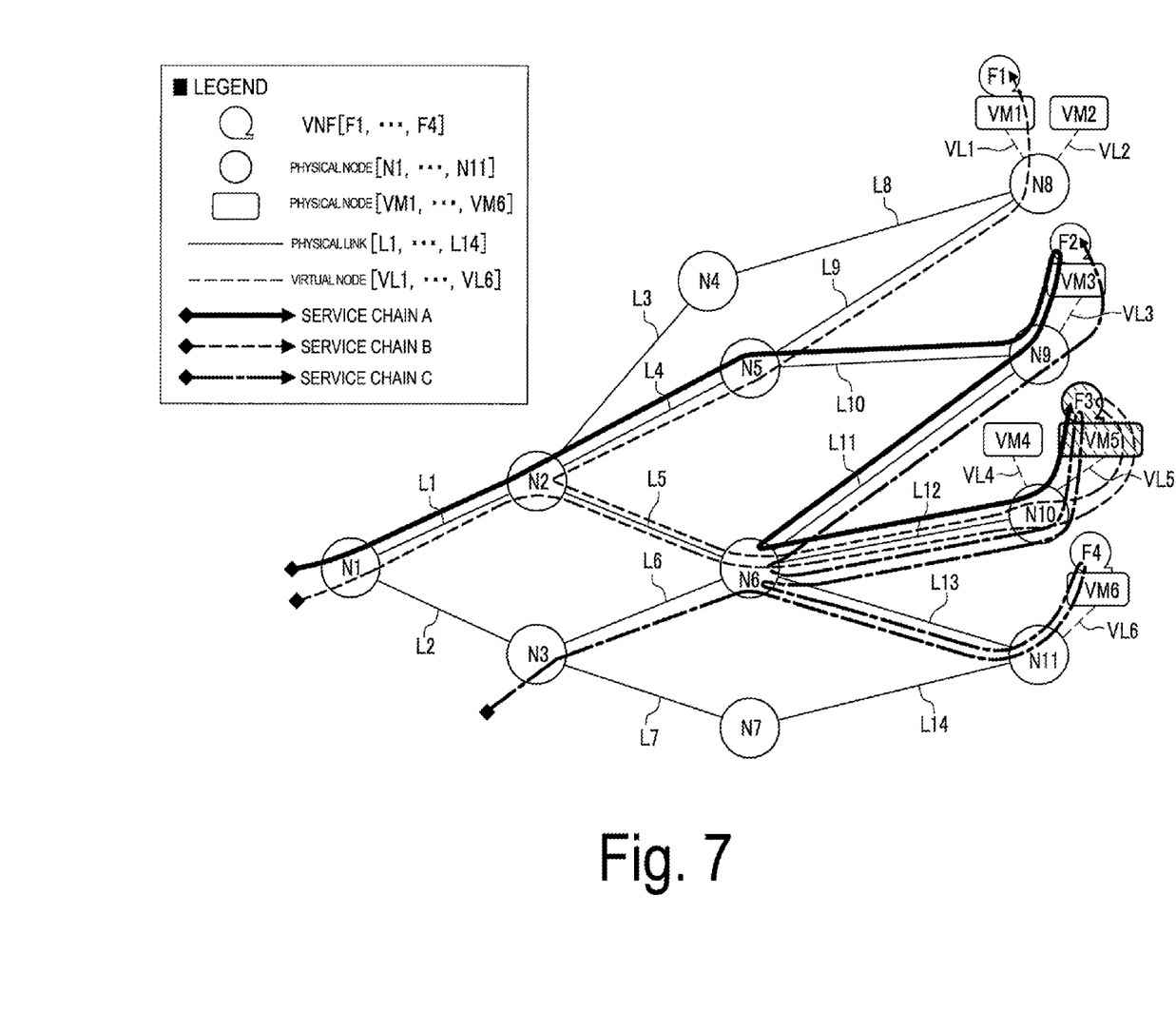
FIG. 7 is an illustrative diagram of the service chain.

FIG. 7 is an illustrative diagram of service chains.

First, as an appliance of physical resources, a physical network system in which physical nodes [N1, . . . , N11] are connected by physical links [L1, . . . , L14] is constructed. For example, the physical node N4 and the physical node N8 are connected by the physical link L8.

It is assumed that virtual nodes [VM1, . . . , VM6] are formed on the physical nodes, and VNFs [F1, . . . , F4] are operating on the virtual nodes. For example, F1 of the VNF is operating on the virtual node VM1.

Further, one or more VNFs are bundled together by the service chains [A, B, C]. Details of the VNF used by each of the service chains will be described below with reference to FIG. 8.

Figure 8:
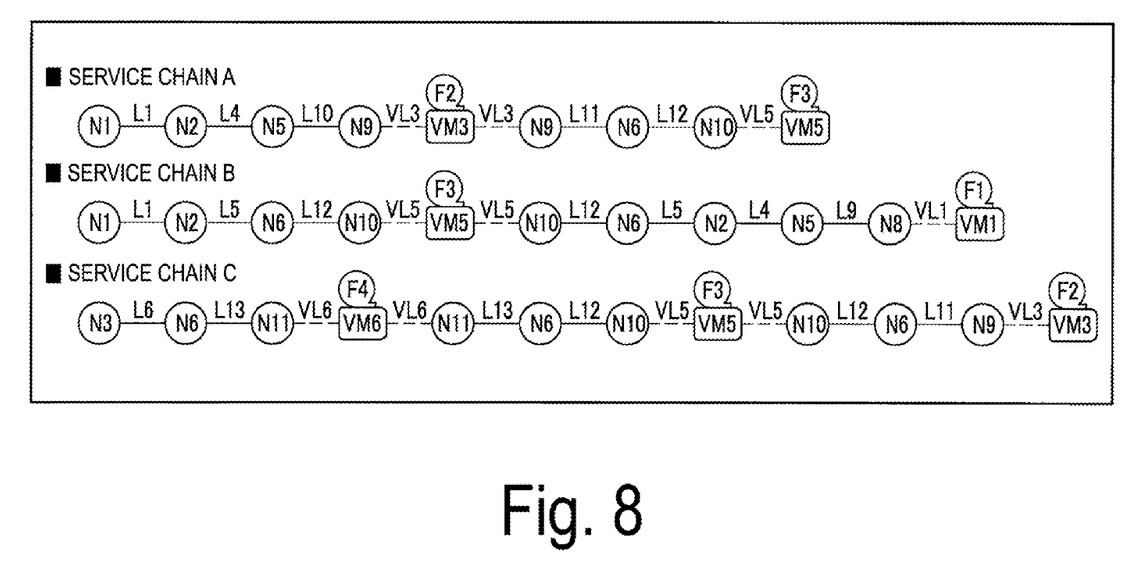
FIG. 8 is a detailed illustrative diagram of a service chain constructed on a physical network system in FIG. 7.

FIG. 8 is a detailed illustrative diagram of service chains constructed on the physical network system in FIG. 7. In FIG. 8, routes tracing physical resources and virtual resources through which service chains [A, B, C] in FIG. 7 pass from a starting point to an ending point in order are illustrated.

The service chain A uses a VNF "F2" on a VM3 and a VNF "F3" on a VM5 at the ending point, starting from a physical node N1 at the starting point.

The service chain B uses a VNF "F3" on a VM5 and a VNF "F1" on a VM1 at the ending point, starting from a physical node N1 at the starting point.

The service chain C uses a VNF "F4" on a VM6, a VNF "F3" on a VM5, and a VNF "F2" on a VM3 at the ending point, starting from a physical node N3 at the starting point. That is, the VNF "F3" is used by the three service chains A to C, the VNF "F2" is used by the two service chains A and C, the VNF "F1" is used only by the service chain B, and the VNF "F4" is used only by the service chain C.

A case is considered in which the service chains described above with reference to FIGS. 7 and 8 are overbooked on the shared VNF and operated as a best effort type.

Here, because processes of a plurality of VNFs cooperate and the service chain is provided as one service, the service chain must be reprocessed from the beginning of the service chain when the processing fails in the VNF in the service chain. That is, all of the processes of the VNFs performed in previous stages from a failure location are wasted, resources in the previous stages are wasted, and quality of the service chains is degraded.

A best effort type technology of the related art such as Patent Literature 1 does not allow for a characteristic of the service chain in which damage due to processing failure of the VNF becomes larger in subsequent stages of the service chain because of a design policy that eliminates the bias across the network. This increases costs for reworking and re-execution of the processes in the previous stages of the service chain.

Therefore, a main object of the present invention is to curb deterioration in quality of service chains at the time of failure while enhancing use efficiency of resources to be used by service chains in a normal state.

Means for Solving the Problem

To solve the above-described problem, a service chain accommodation device of the present invention has the following characteristics.

A service chain accommodation device of the present invention includes an influence coefficient calculation unit configured to calculate an influence coefficient indicating that, for a service chain passing through one or more network functional units, an influence at the time of processing failure of the service chain is greater for a network functional unit of the one or more network functional units that is located in a subsequent stage of the service chain or a network functional unit of the one or more network functional units that is shared among a plurality of service chains including the service chain, a residual resource calculation unit configured to correct an amount of residual resources that are able to be accommodated with the influence coefficient for each of the one or more network functional units through which the service chain passes; and an accommodation design unit configured to, when the service chain is new and the new service chain is accommodated, assign the new service chain such that if there is an existing network functional unit having the amount of residual resources that are able to accommodate an amount of resources required by each of the one or more network functional units through which the new service chain passes, the new service chain is assigned to the existing network functional unit, or if there is no existing network functional unit having the amount of residual resources that are able to be accommodated, the new service chain is assigned to a new network functional unit.

Thus, for network functional units in the subsequent stage of the service chain, disposition of service chains is designed such that an accommodation rate is lowered. Further, for network functional units shared among a plurality of service chains, disposition of service chains is designed such that an accommodation rate is lowered. As a result, a design of a previous stages of the service chain with a high accommodation rate is performed in a normal operation so that a service provider can save capital investment. It is possible to reduce an amount of rework by performing a design of a subsequent stage of a service chain having a low accommodation rate at the time of failure. Further, a design with a low accommodation rate is performed on a network functional unit shared among a plurality of service chains, so that an influence on all the service chains sharing the network functional unit can be reduced at the time of failure. Thus, it is possible to curb subscribers' dissatisfaction with service interruption.

In the present invention, the residual resource calculation unit calculates a lower limit of the amount of residual resources that are able to be accommodated of each of the one or more network functional units, using the amount of resources required by the service chain.

Thus, in the network functional unit of the subsequent stage of the service chain and the network functional unit shared among the plurality of service chains, it is easy for a large amount of resources required by the service chain to be secured, and an influence at the time of processing failure of the service chain can be reduced.

In the present invention, the residual resource calculation unit calculates an upper limit of the amount of residual resources that are able to be accommodated of each of the network functional units, using an amount of resources of a performance value used in the past in the service chain.

Thus, the network functional unit in the previous stage of the service chain secures only an amount of resources of the performance value used in the past in the service chain, so that an accommodation rate of resources can be increased within a reasonable range.

Effects of the Invention

According to the present invention, it is possible to curb deterioration in quality of service chains at the time of failure while enhancing use efficiency of resources to be used by service chains in a normal state.

DESCRIPTION OF EMBODIMENTS

Hereinafter, an embodiment of the present invention will be described in detail with reference to the drawings.

Figure 1:
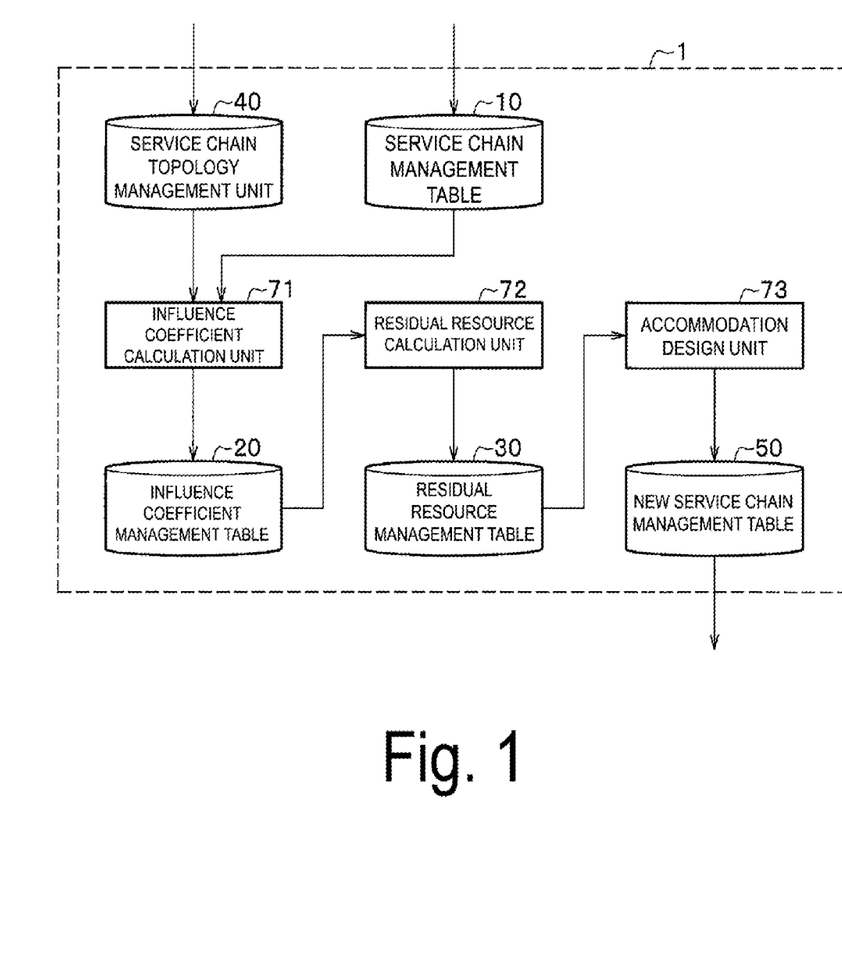
FIG. 1 is a configuration diagram of a service chain accommodation device according to the present embodiment.

FIG. 1 is a configuration diagram of a service chain accommodation device 1.

The service chain accommodation device 1 is constituted as a computer that includes a central processing unit (CPU), a memory, a storage part (a storage unit) such as a hard disk, and a network interface.

In this computer, the CPU executes a program (also referred to as an application or an app that is an abbreviation thereof) loaded into a memory, thereby operating a control unit (control means) constituted by each processing unit.

Figure 5:
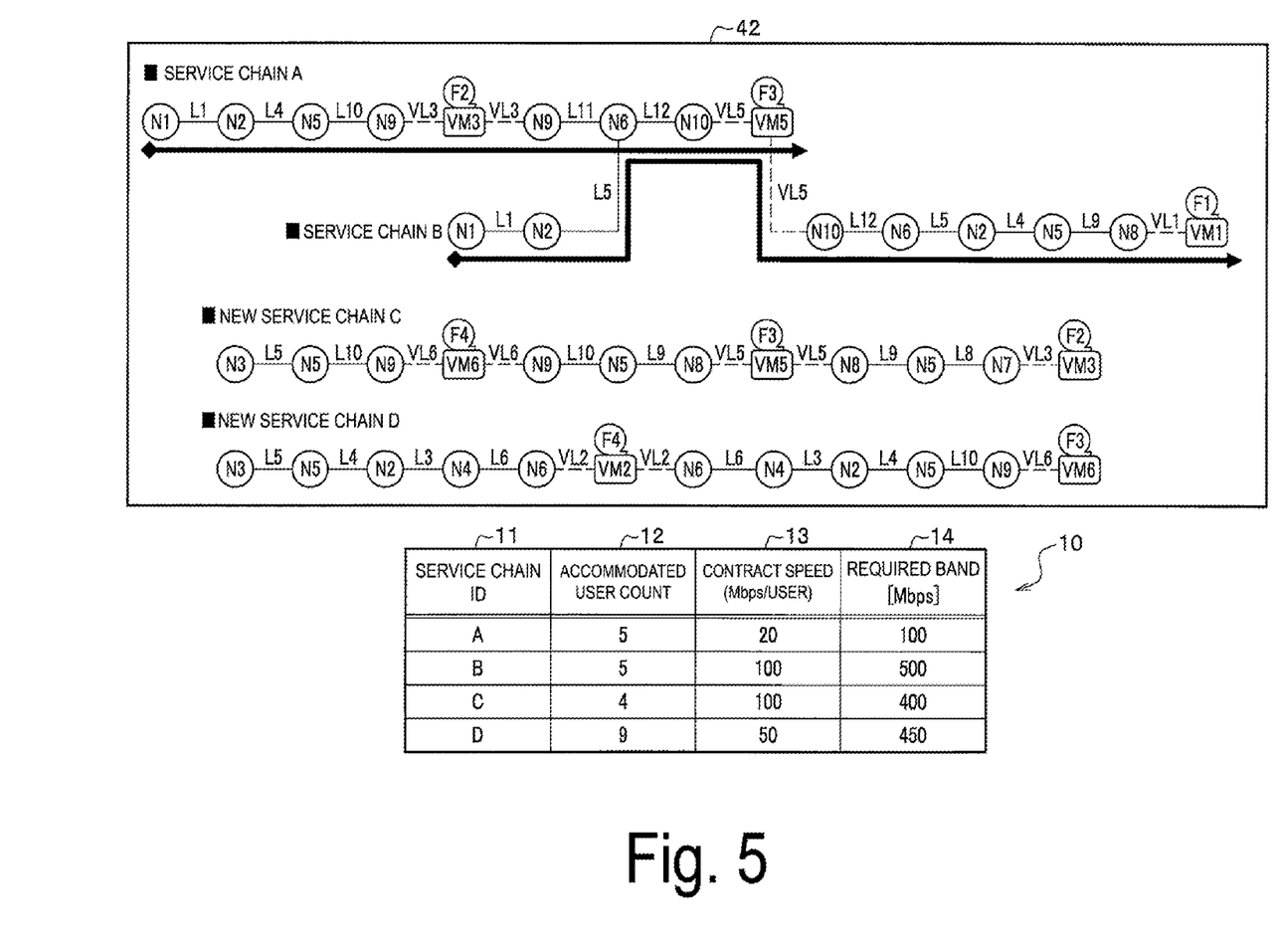
FIG. 5 is a configuration diagram of the service chain topology management unit and the service chain management table when a new service chain is added according to the present embodiment.
Figure 6:
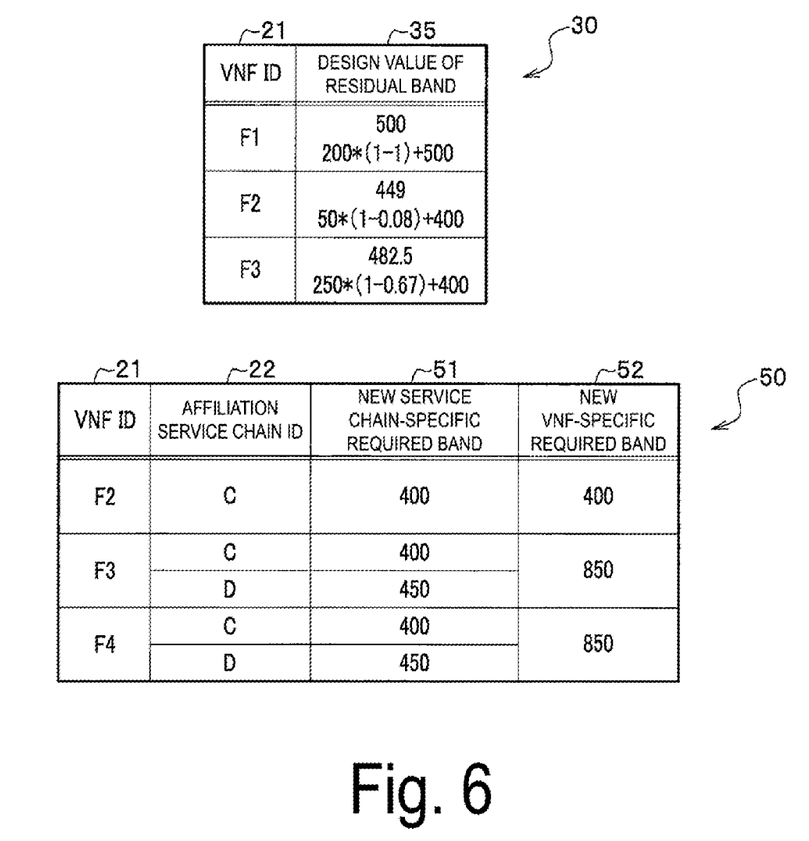
FIG. 6 is a configuration diagram of a residual resource management table and a new service chain management table when a new service chain in FIG. 5 is added according to the present embodiment.

The storage unit of the service chain accommodation device 1 stores a service chain management table 10 (see FIG. 2 for details), an influence coefficient management table 20 (see FIG. 3 for details), a residual resource management table 30 (see FIG. 4 for details), a service chain topology management unit 40 (specifically, a service chain topology 41 in FIG. 2 and a service chain topology 42 in FIG. 5), and a new service chain management table 50 (see FIG. 6 for details).

The service chain accommodation device 1 includes, as processing units, an influence coefficient calculation unit 71, a residual resource calculation unit 72, and an accommodation design unit 73. Each of the processing units will be schematically described below, and details of each processing unit will be clarified in description in FIG. 3 and subsequent drawings. The influence coefficient calculation unit 71 calculates an influence coefficient 28 at the time of overflow for each VNF (network functional unit) (see FIG. 3 for details). The "influence" in the context of the influence coefficient means an influence on a service chain by the processing failure in the VNF, which indicates how many processes on the service chain in a previous stage from the failed VNF have been wasted.

Figure 4:
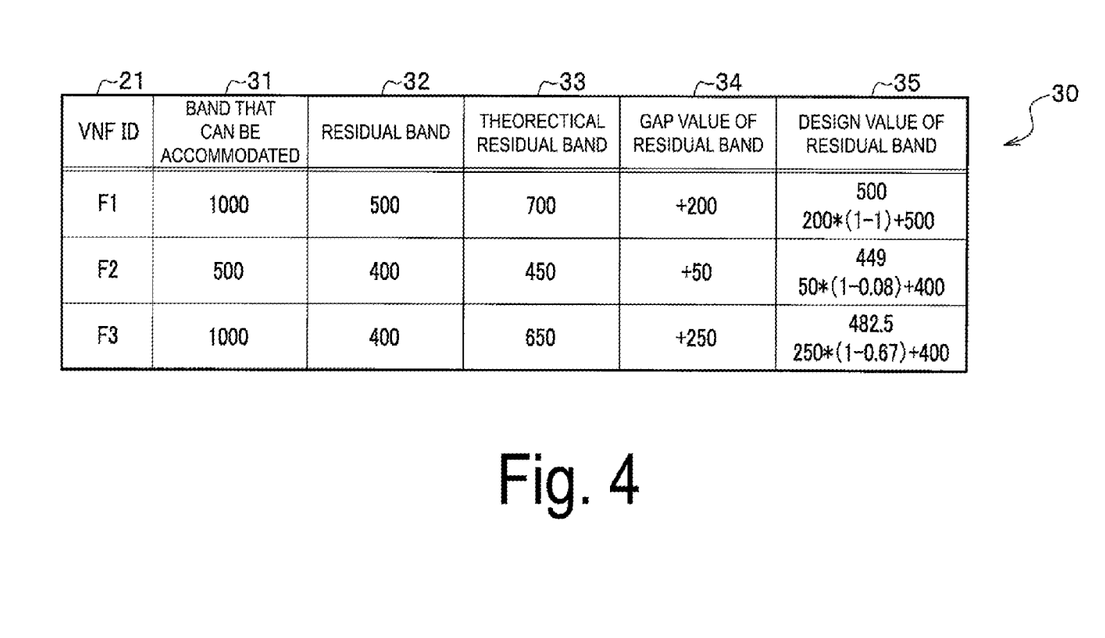
FIG. 4 is a configuration diagram of a residual resource management table according to the present embodiment.

The residual resource calculation unit 72 calculates a design value 35 of a residual band (residual resource) for each VNF (see FIG. 4 for details). The residual band is a surplus of resources indicating how many new service chains can be accommodated in each VNF at a current point in time. The residual resource calculation unit 72 corrects the design value 35 of the residual band using the influence coefficient 28 at the time of overflow. This makes it easy for a new service chain to be arranged in a VNF in a previous stage of the service chain, and makes it difficult for a new service chain to be arranged in a VNF in a subsequent stage of the service chain or in a VNF that is shared among a plurality of service chains.

The accommodation design unit 73 disposes a new service chain in a range that can be accommodated in the design value 35 of the residual band (see FIGS. 5 and 6 for details). On the other hand, when there is no accommodation destination for the new service chain, the accommodation design unit 73 adds new resources.

Figure 2:
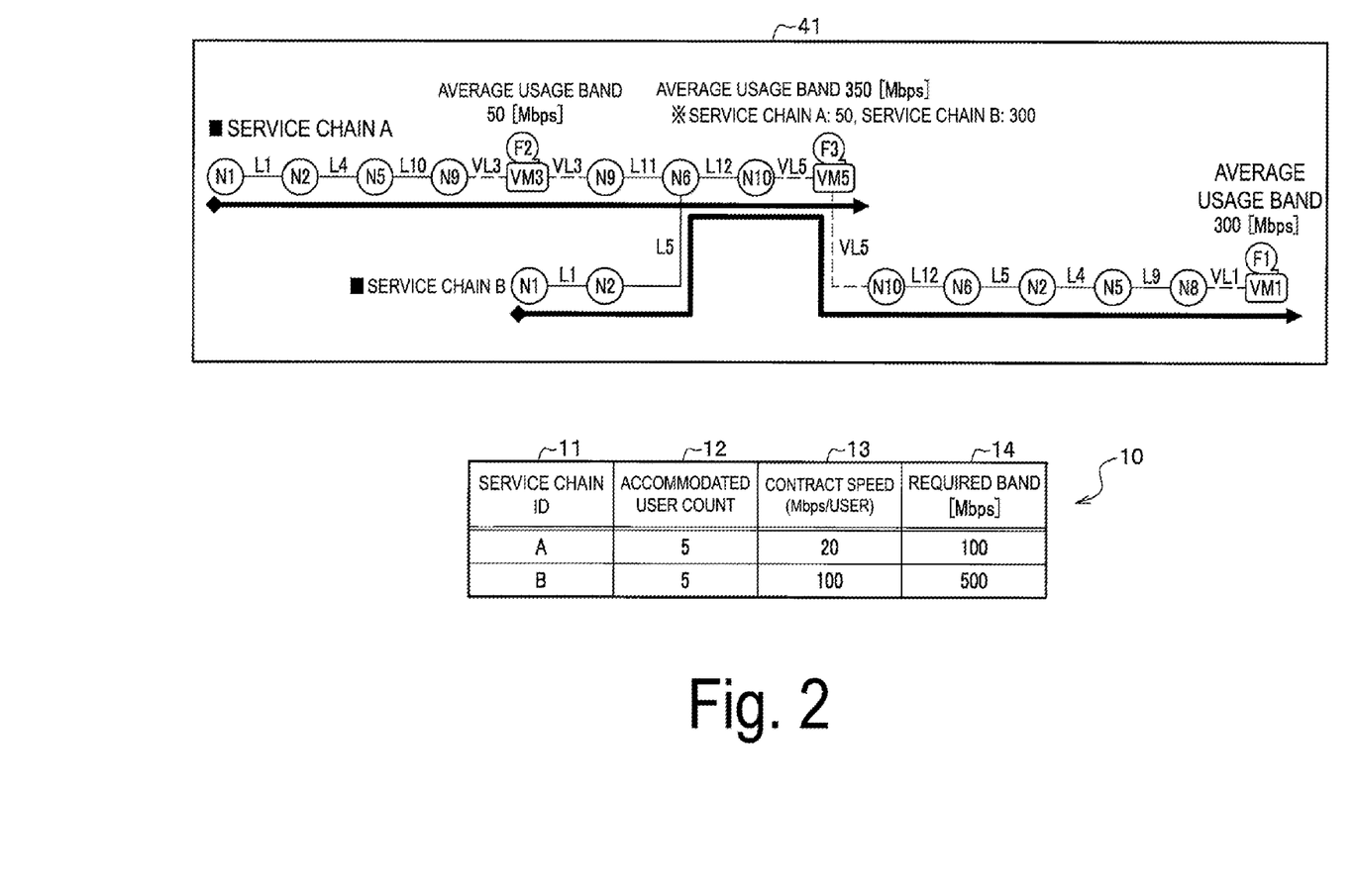
FIG. 2 is a configuration diagram of a service chain topology management unit and a service chain management table according to the present embodiment.

FIG. 2 is a configuration diagram of the service chain topology management unit 40 and the service chain management table 10.

The service chain topology management unit 40 stores the service chain topology 41. Specific routes of the service chains A and B illustrated in FIG. 8 are defined along an arrow from the starting point to the ending point in the service chain topology 41. A portion (N6→N10→VM5) of the routes of the two service chains passes through common devices.

The service chain management table 10 is a table in which a service chain ID 11, an accommodated user count 12, a contract speed 13, and a required band 14 are associated with each other. The service chain management table 10 is prepared by a carrier according to service contract content of each user in advance.

Traffic for users corresponding to the accommodated user count 12 is accommodated in the service chain identified by the service chain ID 11. The required band 14 for each service chain is a product of the accommodated user count 12 for each service chain and the contract speed 13 of each user.

Figure 3:
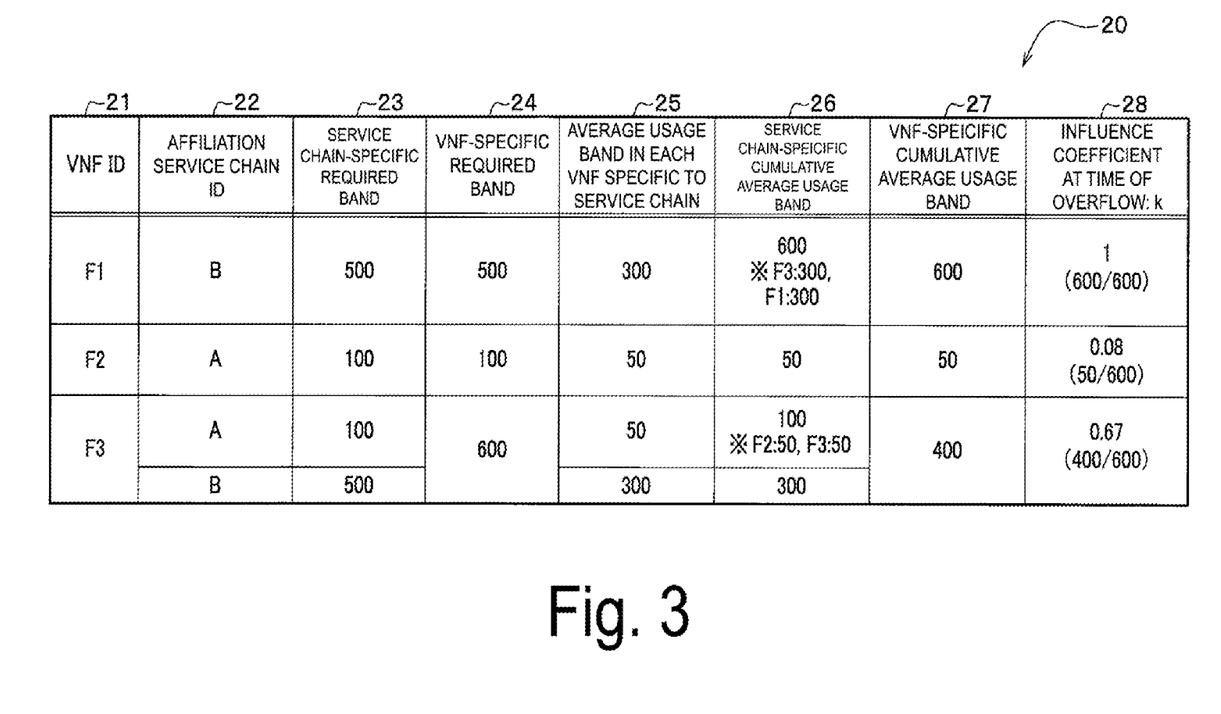
FIG. 3 is a configuration diagram of an influence coefficient management table according to the present embodiment.

FIG. 3 is a configuration diagram of the influence coefficient management table 20. In the influence coefficient management table 20, a VNF ID 21, an affiliation service chain ID 22, a service chain-specific required band 23, a VNF-specific required band 24, an average usage band in each VNF specific to the service chain 25, a service chain-specific cumulative average usage band 26, a VNF-specific cumulative average usage band 27, and the influence coefficient at the time of overflow 28 are associated with each other. Hereinafter, the elements of the influence coefficient management table 20 will be described in order according to calculation procedure: (Step 11) to Step (16).

An "average" in the context of the average usage band in each VNF specific to the service chain 25 and the like means an average value of the usage band when a time during which the service chain operates is separated into predetermined periods of time (for example, one month), and is obtained from a performance value used in the past in the service chain. In the past recorded values, a usage rate of the band greatly varies due to a time of day, a day of the week, and the like. For example, a usage rate increases after 21:00 and on Saturday and Sunday. Therefore, an average value during a long term such as one month was used.

(Step 11) A carrier refers to the service chain topology 41 to input the affiliation service chain ID 22 for each VNF ID 21 in advance. For example, because the service chain passing through VNF=F2 (VM3) in FIG. 2 is only the service chain A, information of combination of VNF ID 21=F2 with the affiliation service chain ID 22=A is input in advance.

(Step 12) The influence coefficient calculation unit 71 sets the required band 14 for each of the service chain IDs 11 as the service chain-specific required bands 23. The influence coefficient calculation unit 71 obtains the VNF-specific required band 24 obtained by summing the service chain-specific required bands 23 for each VNF ID 21.

(Step 13) The carrier refers to past statistical information, such as actual use of about 50% to 60% of the service chain-specific required band 23, to input the average usage band in each VNF specific to the service chain 25 in advance. For example, for a VNF ID 21=F2, 50 that is a result of multiplying 100 of the required band by 0.5 is input as the average usage band in each VNF specific to the service chain 25.

(Step 14) The influence coefficient calculation unit 71 traces the route of the service chain from the starting point to the ending point of the route to obtain the service chain-specific cumulative average usage band 26 at each point (VNF) on the route of the service chain.

For example, F3 on VM5 is an ending point of the route according to the service chain A and is located after F2 on VM3. Thus, the service chain-specific cumulative average usage band 26 in F3 of the service chain A is 100, which is a sum (a cumulative sum) of the average usage band in each VNF specific to the service chain 25 in the previous stage (F2)=50 and 50 of itself (F3). On the other hand, F3 on the same VM 5 is located on the starting point (a first point) of the route depending on the service chain B. Thus, because there is no VNF in the previous stage, the service chain-specific cumulative average usage band 26 in F3 of the service chain B becomes the average usage band in each VNF specific to the service chain 25 of itself=300.

(Step 15) The influence coefficient calculation unit 71 obtains the VNF-specific cumulative average usage band 27 obtained by summing the service chain-specific cumulative average usage bands 26 for each VNF ID 21.

(Step 16) The influence coefficient calculation unit 71 obtains a result of dividing the service chain-specific cumulative average usage bands 26 (600, 50, and 400 in order from the top of the table) for each VNF ID 21 by a maximum value (=600) of the service chain-specific cumulative average usage band 26, as the influence coefficient at the time of overflow 28 (k). When the VNF has a great influence coefficient at the time of overflow 28, an influence on (damage to) the user is greater when an abnormality of the service chain such as overflow occurs. In other words, profitability of carriers can be improved by having a large number of service chains to be accommodated in the VNF having the small influence coefficient at the time of overflow 28.

FIG. 4 is a configuration diagram of the residual resource management table 30.
In the residual resource management table 30, a band that can be accommodated 31, a residual band 32, a theoretical residual band 33, a gap value of the residual band 34, and a design value of the residual band 35 are associated with each other. Hereinafter, respective elements of the residual resource management table 30 will be described in order according to calculation procedure: (Step 21) to (Step 23).

(Step 21) The carrier inputs the band that can be accommodated 31 for each VNF ID 21 in advance. It is obvious that, when a VM has higher performance, a large number of bands can be accommodated in the VNF operating on that VM. There is a limitation (an upper limit of the accommodation band) on the VNF itself. For example, the VNF is often licensed, and price varies with a performance value of the band (the band that can be accommodated 31) that can be accommodated in the VNF. Thus, an efficient accommodation design is required.

(Step 22) The residual resource calculation unit 72 sets a result of subtracting the VNF-specific required band 24 from the band that can be accommodated 31 as the residual band 32 for each VNF ID 21. The residual resource calculation unit 72 sets a result of subtracting the average usage band in each VNF specific to the service chain 25 from the band that can be accommodated 31, as the theoretical residual band 33. Further, the residual resource calculation unit 72 sets a result of subtracting the residual band 32 from the theoretical residual band 33 as the gap value of the residual band 34.

(Step 23) The residual resource calculation unit 72 obtains the design value of the residual band 35 using the following equation.

(Design value of residual band 35)=(gap value of residual band 34)*(1−k)+(residual band 32)

k denotes an influence coefficient at the time of overflow 28. For the VNF located in the subsequent stage of the service chain and the VNF shared among a plurality of service chains, the influence coefficient at the time of overflow 28 increases. Thus, when the design value of the residual band 35 approaches a value of the residual band 32 rather than a value of the theoretical residual band 33, overflow is unlikely.

As supplemental description of (Step 22), for example, because VNF=F1 has a processing capacity of a band of 1000 and a user accommodated in F1 requires a band of 500, there is a surplus (residual band 32) of a processing capacity of 1000−500=500. However, because the user is expected to use only the band of 300 while requiring the band of 500, it can be said that there is a surplus (theoretical remaining band 33) of the processing capacity of 1000−300=700. That is, there is the gap value of the residual band 34 of 200 between the required band and the usage band.
For VNF having the greater gap value of the residual band 34, a larger number of VNFs can be accommodated in VNF, which makes it possible to reduce addition of new VNFs and curb equipment costs.

FIG. 5 is a configuration diagram of the service chain topology management unit 40 and the service chain management table 10 when a new service chain is added.
First, the service chain topology 42 in FIG. 5 is a service chain topology of when the new service chains C and D are added to the service chain topology 41 in FIG. 2. Similarly, the service chain management table 10 in FIG. 5 is a table of when the new service chains C and D are added to the service chain management table 10 in FIG. 2. Hereinafter, a process in which the accommodation design unit 73 calculates how new service chains C and D are arranged in a network will be described in detail.

FIG. 6 is a configuration diagram of the residual resource management table 30 and the new service chain management table 50 when the new service chains C and D in FIG. 5 are added. The residual resource calculation unit 72 also calculates each of items of the residual resource management table 30 for the new service chains C and D in FIG. 5, as illustrated in FIG. 4 (only the design value of the residual band 35 is illustrated in FIG. 6).
The influence coefficient calculation unit 71 also calculates each of items of the new service chain management table 50 for the new service chains C and D in FIG. 5, as illustrated in FIG. 4.

The influence coefficient calculation unit 71 calculates a new service chain-specific required band 51 of the new service chain management table 50 using a method of calculating the service chain-specific required band 23 in the influence coefficient management table 20.

The influence coefficient calculation unit 71 calculates a new VNF-specific required band 52 in the new service chain management table 50 using a method of calculating the VNF-specific required band 24 of the influence coefficient management table 20.

The accommodation design unit 73 compares the design value of the residual band 35 with the new service chain management table 50 to determine an accommodation destination of each of the VNFs included in the new service chain C and D in the following order of calculations of (Accommodation 1) to (Accommodation 3). VNFs with the same processing content may be distributed and disposed in a plurality of VMs, respectively. In this case, a set of the distributed VNFs is referred to as "the same type of VNFs".
(Accommodation 1) When (Design value of the residual band 35 of the same type of VNF that has already been added)≥(new VNF-specific required band 52), a new service chain is accommodated in "the same type of VNF that has already been added" on the left side of the above relationship. For example, because (design value of the residual band 35 of VNF=F2=449)≥(new VNF-specific required band 52=400), F2 of the service chain C is arranged on the F2 that has already been added.

(Accommodation 2) In the case of a VNF not satisfying (Accommodation 1) above, when (Design value of the residual band 35 of the same type of VNF that has already been added)≥(new service chain-specific required band 51), only some of the new service chains that satisfy this expression are accommodated in "the same type of VNF that has already been added" on the left side of the above relationship. For example, the following is an example in which two service chains cannot be accommodated simultaneously, but only one of them can be accommodated.

(Design value of the residual band 35 of VNF=F3=482.5)
≥(new service chain-specific required band 51 of the service chain C=400)
(Design value of the residual band 35 of VNF=F3=482.5)
≥(new service chain-specific required band 51 of the service chain D=450)

In this case, the accommodation design unit 73, for example, may accommodate the service chain C in the existing VNF=F3, and accommodate the remaining service chain D in a VNF added newly.

(Accommodation 3) In the case of a VNF that does not satisfy either (Accommodation 1) or (Accommodation 2), the VNF is newly added and all new service chains are accommodated in the added VNF. For example, in VNF=F4, because there is no VNF that has already been added in the first place, it is necessary for VNFs for accommodating new service chains to be newly added. As described above, the accommodation design unit 73 allows accommodation of new service chains in order of (Accommodation 1), (Accommodation 2), and (Accommodation 3) to utilize the same type of VNFs that have already been added as much as possible to increase the accommodation rate. That is, the profitability of an infrastructure operator can be improved by curbing addition of VNFs for accommodating new service chains as much as possible.

In the embodiment described above, the influence coefficient calculation unit 71 has calculated the service chain-specific cumulative average usage band 26 in consideration of the service chain topology 42.

That is, for a VNF that is in the subsequent stage of the service chain and is shared by a plurality of service chains, the VNF-specific cumulative average usage band 27 increases, and thus, the influence coefficient at the time of overflow 28 also increases.

Further, the accommodation design unit 73 designs disposition of each of the service chains such that the accommodation rate is lowered for the VNF in the subsequent stage of the service chain depending on the influence coefficient at the time of overflow 28.

This allows VNFs having a high accommodation rate in a best effort type to concentrate on the previous stages of the service chain and VNFs having a low accommodation rate to concentrate on the subsequent stages of the service chain. Thus, even for a VNF in the subsequent stage of the service chain on which an influence at the time of processing failure is great, a margin is secured through assignment of fewer service chains, such that it is possible to curb deterioration in quality of the service chain even at the time of processing failure.

The service chain is a technique for constructing one service by selecting a plurality of VNFs and connecting the VNFs in a string. From structural characteristics of the connection in the string, when the processing fails in VNF in the subsequent stage, an amount of processing in the previous stage that is wasted increases, and a degree of deterioration in quality of the service chain increases.

Therefore, the service chain accommodation device 1 of the present embodiment calculates an imbalance disposition such that previous stages of the service chain are densely disposed in the VNF and subsequent stages of the service chain are sparsely disposed in the VNF on the basis of the structural characteristics of such a service chain.

As a result, a design of t previous stages of the service chain with a high accommodation rate is performed in a normal operation so that a service provider can save capital investment. It is possible to curb dissatisfaction of service interruption for subscribers by reducing an amount of rework of the subsequent stage of the service chain having a low accommodation rate at the time of failure.

Further, the residual resource calculation unit 72 calculates, as the design value of the residual band 35 recognized by the accommodation design unit 73, an intermediate value between the residual band 32 after all of the required band of the user are ensured and the theoretical residual band 33 after only the usage band of the user has been expected and ensured, according to the influence coefficient at the time of overflow 28.

This can realize a well-balanced accommodation rate between the guarantee type using the residual band 32 and the best effort type having a high accommodation rate using the theoretical residual band 33.

On the other hand, the guarantee type using the residual band 32 has the residual band 32 of VNF=F3=400, as illustrated in FIG. 4. Thus, in the accommodation design unit 73, because the new service chain-specific required band 51=450 of the service chain D cannot be accommodated in (Accommodation 2), the accommodation rate is reduced due to new addition of F3. Alternatively, the best effort type using the theoretical residual band 33 has the theoretical residual band 33 of VNF=F1=700, as illustrated in FIG. 4. Thus, the accommodation design unit 73 still has a margin of the residual 300 after the new VNF-specific required band 52 of the service chain C=400 is accommodated in (Accommodation 1). However, when another service chain is accommodated with this margin of 300, the accommodation rate can be increased, but a risk of processing failure of dense VNF=F1 increases.

In the present embodiment, the service chain accommodation device 1 according to the present invention handles four types of service chains A to D as illustrated in FIG. 5, the present invention is not limited to numbers or configurations of these. The present invention can be realized by a program that causes hardware resources of a general computer to operate as each of the units of the service chain accommodation device 1. This program may also be distributed over a communications line or may be recorded and distributed on a recording medium such as a CD-ROM.

REFERENCE SIGNS LIST

1 Service chain accommodation device
10 Service chain management table
11 Service chain ID
12 Accommodated user count
13 Contract speed
14 Required band
20 Influence coefficient management table
21 VNF ID
22 Affiliation service chain ID
23 Service chain-specific required band
24 VNF-specific required band
25 Average usage band in each VNF specific to service chain
26 Service chain-specific cumulative average usage band
27 VNF-specific cumulative average usage band
28 Influence coefficient at the time of overflow
30 Residual resource management table
31 Band that can be accommodated
32 Residual band
33 Theoretical residual band
34 Gap value of residual band 35 Design value of residual band
40 Service chain topology management unit
41 Service chain topology
42 Service chain topology
50 New service chain management table
51 New service chain-specific required band
52 New VNF-specific required band
71 Influence coefficient calculation unit
72 Residual resource calculation unit
73 Accommodation design unit

The invention claimed is:

1. A service chain accommodation device comprising:
an influence coefficient calculation unit, including one or more hardware processors, configured to calculate an influence coefficient for each of one or more network functional units (VNFs), the influence coefficient of a VNF indicating, for a service chain passing through the one or more VNFs, an influence of the VNF on the service chain at a time of processing failure of the VNF, wherein the influence of a VNF on the service chain is greater when i) the VNF is located in a subsequent stage of the service chain or ii) the VNF is shared among a plurality of service chains including the service chain;
a residual resource calculation unit, including one or more hardware processors, configured to calculate an amount of residual resources for each of the one or more VNFs using the influence coefficient for each of the one or more VNFs; and
an accommodation design unit, including one or more hardware processors, configured to accommodate a new service chain, wherein accommodating the new service chain comprises:
i) if there is an existing VNF included in the one or more VNFs having the amount of residual resources that is larger than or equal to an amount of resources required by at least one VNF through which the new service chain passes, assigning the new service chain to the existing VNF, or
ii) if there is no existing VNF having the amount of residual resources that is larger than or equal to the amount of resources required by at least one VNF through which the new service chain passes, assigning the new service chain to a new VNF.

2. The service chain accommodation device according to claim 1, wherein the residual resource calculation unit is configured to calculate a lower limit of the amount of residual resources that are able to be accommodated of each of the one or more network functional units, using an amount of resources required by the service chain.

3. The service chain accommodation device according to claim 1, wherein the residual resource calculation unit is configured to calculate an upper limit of the amount of residual resources that are able to be accommodated of each of the network functional units, using an amount of resources of a performance value used in the past in the service chain.

4. A service chain accommodation method performed by a service chain accommodation device including an influence coefficient calculation unit, a residual resource calculation unit, and an accommodation design unit, wherein:
the influence coefficient calculation unit, including one or more hardware processors, calculates an influence coefficient for each of one or more network functional units (VNFs), the influence coefficient of a VNF indicating, for a service chain passing through the one or more VNFs, an influence of the VNF on the service chain at a time of processing failure of the VNF, wherein the influence of a VNF on the service chain is greater when i) the VNF is located in a subsequent stage of the service chain or ii) the VNF is shared among a plurality of service chains including the service chain,
the residual resource calculation unit, including one or more hardware processors, calculate an amount of residual resources for each of the one or more VNFs using the influence coefficient for each of the one or more VNFs, and
the accommodation design unit, including one or more hardware processors, accommodates a new service chain, wherein accommodating the new service chain comprises:
i) if there is an existing VNF included in the one or more VNFs having the amount of residual resources that is larger than or equal to an amount of resources required by at least one VNF through which the new service chain passes, assigning the new service chain is to the existing VNF, or
ii) if there is no existing VNF having the amount of residual resources that is larger than or equal to the amount of resources required by at least one VNF through which the new service chain passes, assigning the new service chain to a new VNF.

5. The service chain accommodation method according to claim 4, wherein the residual resource calculation unit calculates a lower limit of the amount of residual resources that are able to be accommodated of each of the one or more network functional units, using an amount of resources required by the service chain.

6. The service chain accommodation method according to claim 4, wherein the residual resource calculation unit calculates an upper limit of the amount of residual resources that are able to be accommodated of each of the network functional units, using an amount of resources of a performance value used in the past in the service chain.

* * * * *